United States Patent
Jordan et al.

(10) Patent No.: US 10,472,286 B2
(45) Date of Patent: Nov. 12, 2019

(54) YTTRIUM ALUMINUM GARNET BASED THERMAL BARRIER COATINGS

(71) Applicant: The University of Connecticut, Farmington, CT (US)

(72) Inventors: Eric H Jordan, Storrs, CT (US); Maurice Gell, Somerset, NJ (US); Rishi Kumar, Ashford, CT (US); Chen Jiang, Willimantic, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 683 days.

(21) Appl. No.: 15/040,871

(22) Filed: Feb. 10, 2016

(65) Prior Publication Data
US 2016/0257618 A1 Sep. 8, 2016

Related U.S. Application Data

(60) Provisional application No. 62/114,264, filed on Feb. 10, 2015.

(51) Int. Cl.
| | | |
|---|---|---|
| *C04B 35/505* | (2006.01) | |
| *C01F 17/00* | (2006.01) | |
| *B32B 18/00* | (2006.01) | |

(52) U.S. Cl.
CPC ............ *C04B 35/505* (2013.01); *B32B 18/00* (2013.01); *C01F 17/0025* (2013.01); *C01P 2002/72* (2013.01); *C01P 2006/37* (2013.01); *C04B 2235/3222* (2013.01); *C04B 2235/3225* (2013.01); *C04B 2235/79* (2013.01); *C04B 2237/34* (2013.01); *C04B 2237/343* (2013.01); *C04B 2237/348* (2013.01)

(58) Field of Classification Search
CPC ............ C04B 35/505; C04B 2237/348; C04B 2237/343; C04B 2237/34; C04B 2235/79; C04B 2235/3225; C04B 2235/3222; B32B 18/00; C01F 17/0025; C01P 2002/72; C01P 2006/37
See application file for complete search history.

(56) References Cited

U.S. PATENT DOCUMENTS

| | | | |
|---|---|---|---|
| 2004/0001977 A1 * | 1/2004 | Subramanian | .......... C23C 28/00 428/702 |
| 2008/0008839 A1 * | 1/2008 | Lee | ........................ C23C 28/321 427/402 |
| 2009/0169914 A1 * | 7/2009 | Fu | .......................... C23C 28/321 428/610 |

FOREIGN PATENT DOCUMENTS

| | | | | |
|---|---|---|---|---|
| WO | WO2013-163058 | * | 10/2013 | ............... B05D 1/08 |

* cited by examiner

*Primary Examiner* — Jonathan C Langman
(74) *Attorney, Agent, or Firm* — Intellectual Strategies

(57) ABSTRACT

Embodiments of a microstructure that allows arrest of contaminant infiltration includes an inter layer and at least one highly reactive ceramic layer. The inter layer is not reactive to an infiltrating reactive species. The HRC layer includes materials that react with a reactive contaminant species to slow or arrest infiltration of such contaminant species.

9 Claims, 6 Drawing Sheets

A- three component microstructure having layers of alternating materials

B- three component microstructure having layers of alternating materials - 2 layers are of mixed composition

YTTRIUM ALUMINUM GARNET BASED THERMAL BARRIER COATINGS

CROSS-REFENENCE TO RELATED APPLICATIONS

This application claims the benefit of U.S. Provisional Patent Application Ser. No. 62/114,264 filed on Feb. 10, 2015, and entitled "Improved Yttrium Aluminum Garnet Based Thermal Barrier Coating," the contents of which are hereby incorporated by reference herein.

STATEMENT OF FEDERALLY SPONSORED RESEARCH

This invention was made with Government support under DE-SC0007544 awarded by the Department of Energy. The Government has certain rights to this invention.

FIELD OF INVENTION

The disclosure contained herein is in the general field of compositions, equipment and methods related to thermal barrier coatings and more specifically of yttrium aluminum garnet (YAG) thermal barrier coatings.

BACKGROUND

Thermal barrier coatings (TBCs) are used to protect hot section components of equipment such as aircraft engines, marine propulsion systems, and industrial gas turbines, from the extreme temperatures of the associated gas. Advanced thermal barrier coatings are needed to satisfy more demanding durability requirements, such as those of industrial gas turbines operating at turbine inlet temperatures of 2650° F. (1454° C.) and beyond.

Yttrium aluminum garnet (YAG) has desirable properties for a thermal barrier coating as previously disclosed, for example, in International Publication Number WO 2013/163058, published on Oct. 31, 2013, which also discloses methods of making such coatings. In some embodiments such coatings can be made to have significantly reduced thermal conductivity by doping with other elements.

SUMMARY

Embodiments of a method of making thermal barrier coatings having improved resistance to CMAS are described. In one embodiment, the thermal barrier coatings include YAG. In one embodiment, the inherent inert properties of YAG provide some, most, or all of the CMAS resistance. In some embodiments, the improved resistance to CMAS is further provided by promoting CMAS blocking reactions only in cracks, pores, and pore channels of the thermal barrier coatings. Other embodiments of a method of making thermal barrier coatings having improved resistance to CMAS are described.

Embodiments of a microstructure that allows arrest of contaminant infiltration are described. In one embodiment, the microstructure includes an inter layer. The inter layer is not reactive to an infiltrating reactive species. In one embodiment, the microstructure further comprises at least one highly reactive ceramic (HRC) layer. The HRC layer includes materials that react with a reactive contaminant species to slow or arrest infiltration of such contaminant species. Other embodiments of a microstructure that allows arrest of contaminant infiltration are described.

Other aspects and advantages of embodiments of the present invention will become apparent from the following detailed description, taken in conjunction with the accompanying drawings illustrated by way of example of the principles of the invention.

Figure 1:
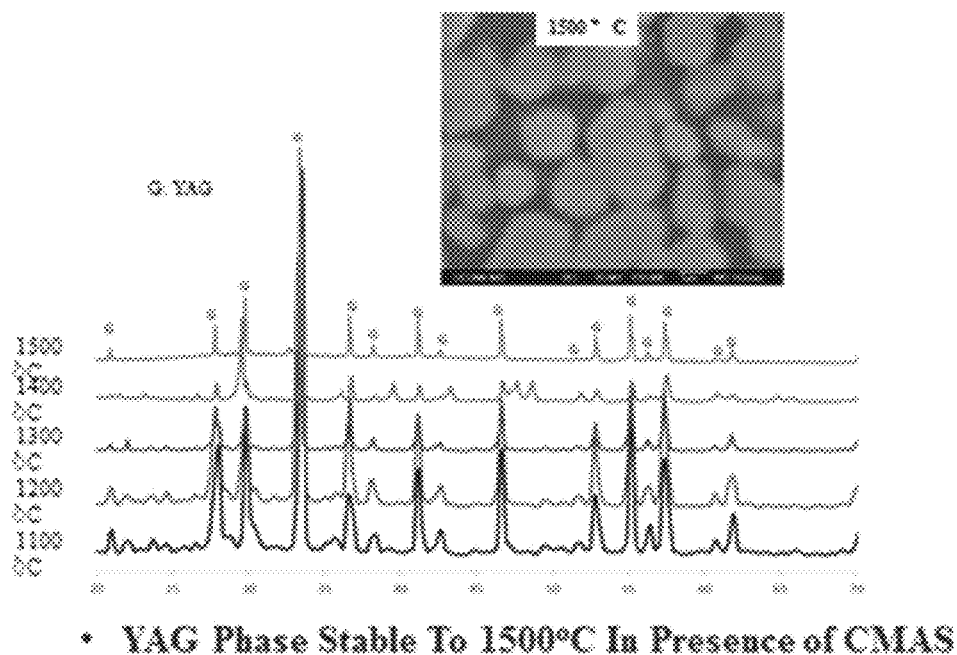
FIG. 1 depicts one embodiment of a diagram of a phase stability and inert behavior of YAG in the presence of CMAS.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, and embodiments as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "some embodiments", or similar language means that a particular feature, structure, or characteristic described in connection with the indicated embodiment is included in at least one embodiment of the present invention. Thus, the phrases "in one embodiment", "in an embodiment", "in some embodiments", and similar language throughout this specification may, but do not necessarily, all refer to the same embodiment.

While many embodiments are described herein, at least some of the described embodiments facilitate the enhancement of the durability of ceramic coatings.

FIG. 1 depicts one embodiment of a diagram of a phase stability and inert behavior of YAG in the presence of CMAS.

Figure 2:
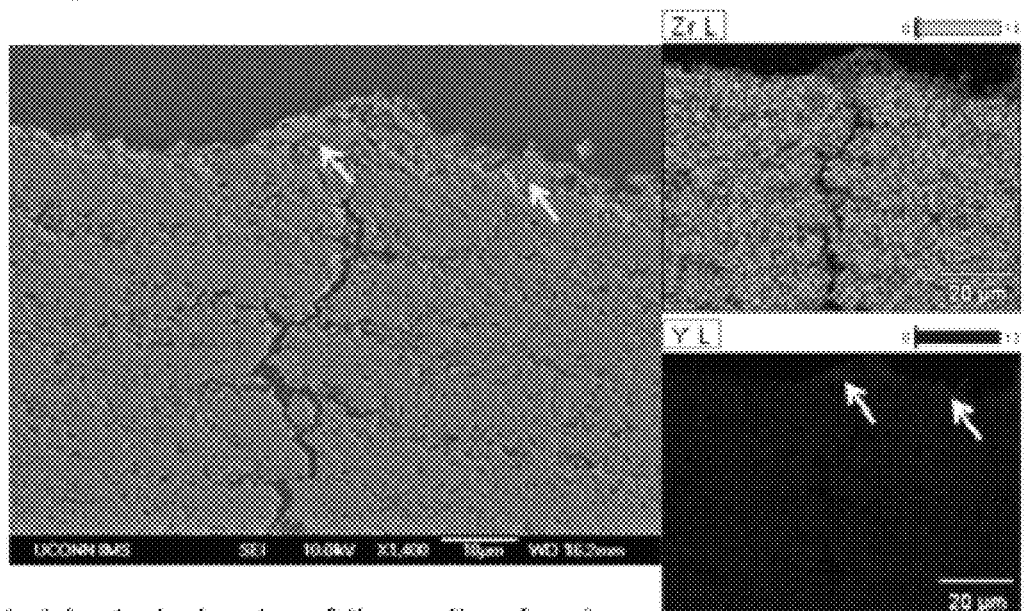
FIG. 2 depicts one embodiment of infiltration of YSZ with pure yttria materials.

FIG. 2 depicts one embodiment of infiltration of YSZ with pure yttria materials.

Figure 3:
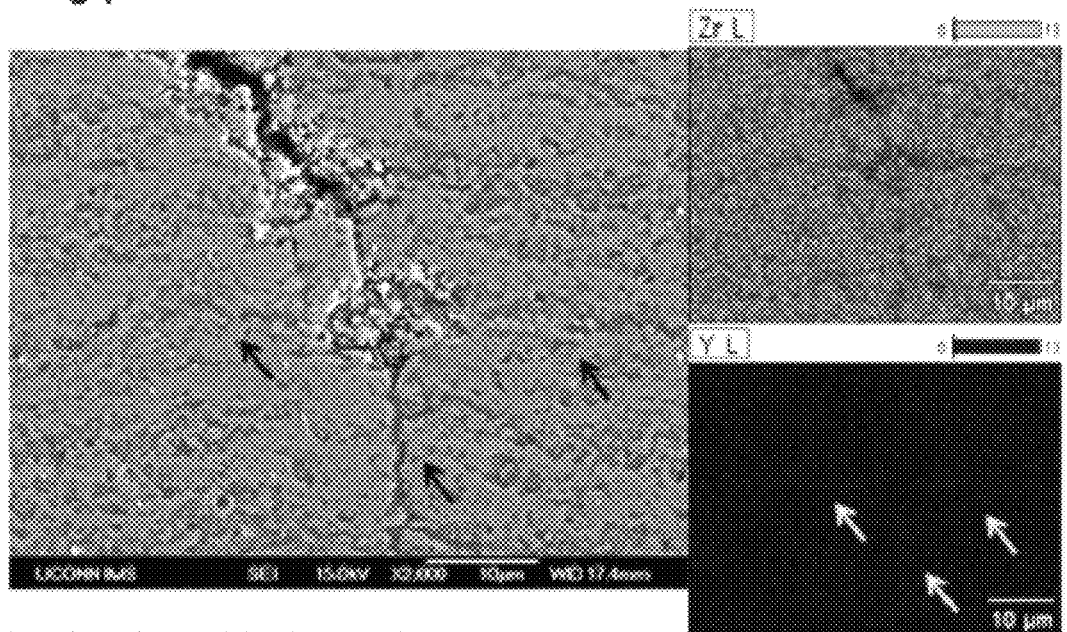
FIG. 3 depicts one embodiment of infiltration of YSZ with yttria via precursors.

FIG. 3 depicts one embodiment of infiltration of YSZ with yttria via precursors.

Figure 4:
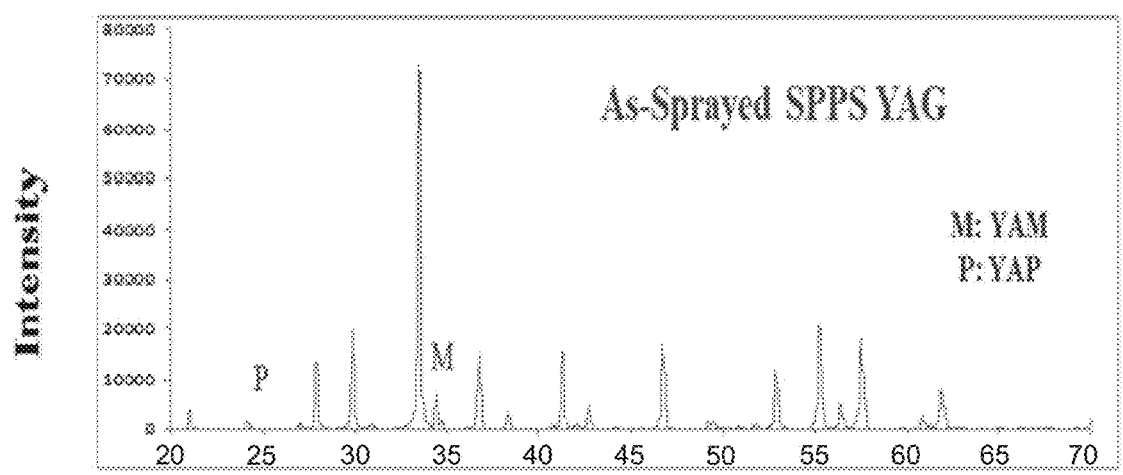
FIG. 4 depicts one embodiment of diagram of YAG with small excess of yttrium showing primarily YAM as the second phase.

FIG. 4 depicts one embodiment of diagram of YAG with small excess of yttrium showing primarily YAM as the second phase.

Figure 5:
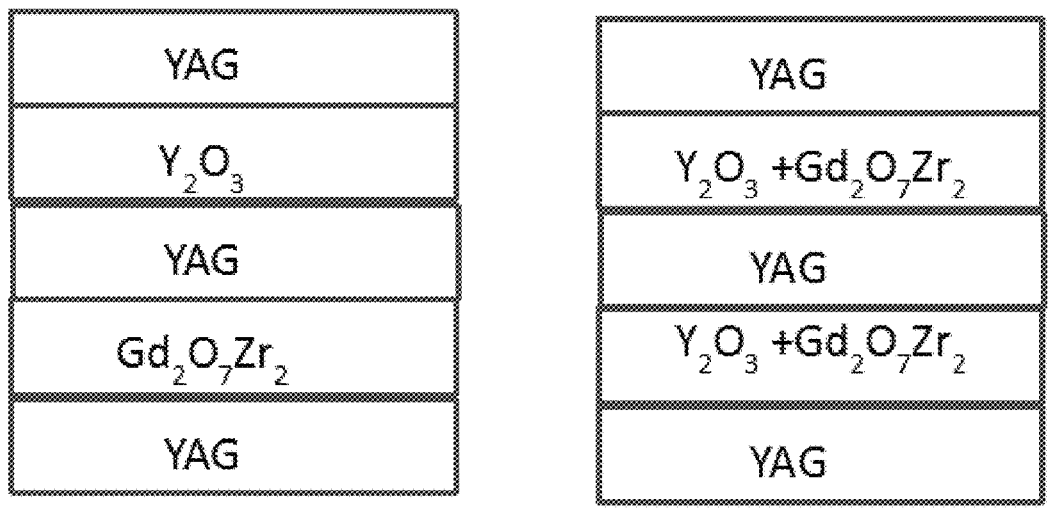
FIG. 5 depicts embodiments of arrangements of layers greater than two components.

FIG. 5 depicts embodiments of arrangements of layers greater than two components.

Figure 6:
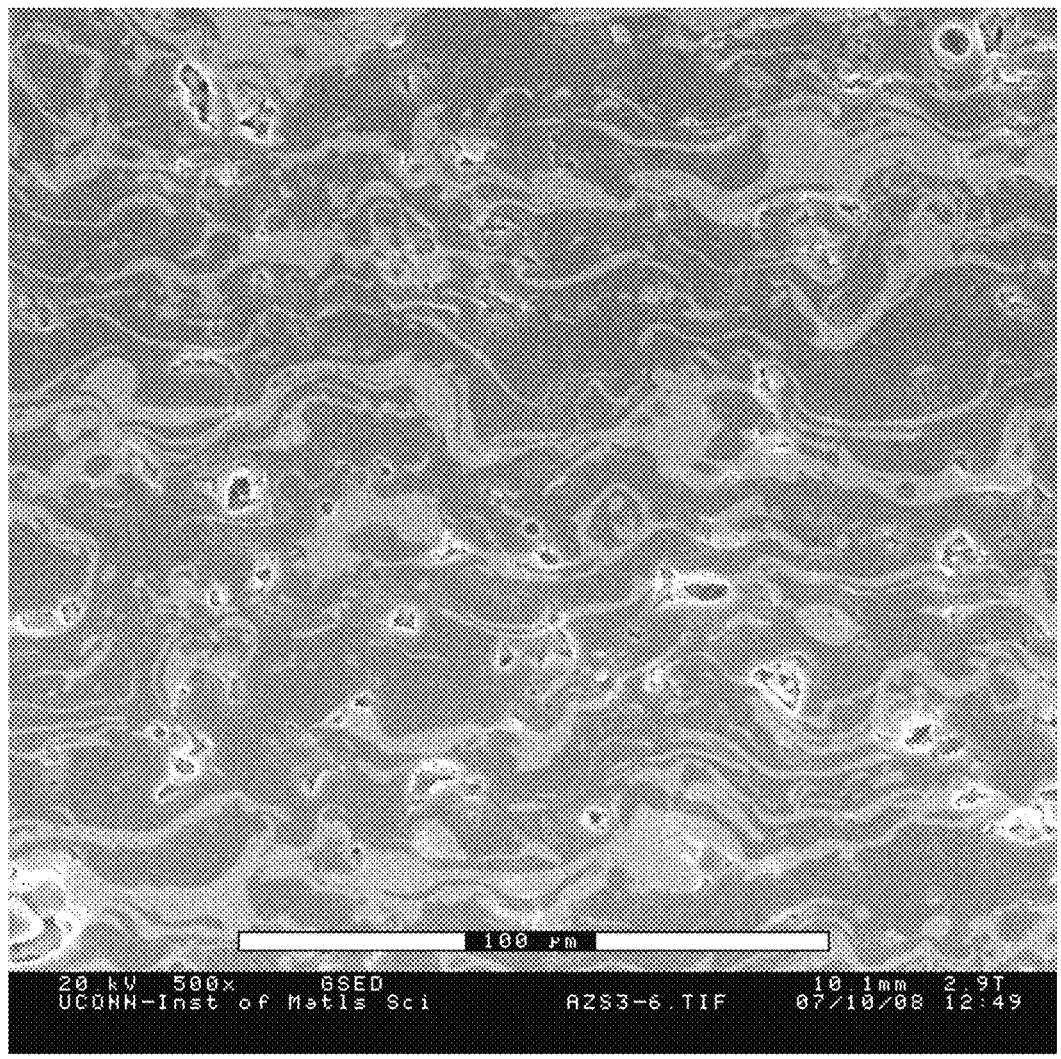
FIG. 6 depicts an embodiment of APS $Al_2O_3$-40 wt % $ZrO_2$ Using $Al_2O_3$—$ZrO_2$ powder.

FIG. 6 depicts an embodiment of APS $Al_2O_3$-40 wt % $ZrO_2$ Using $Al_2O_3$—$ZrO_2$ powder.

Thermal barrier coatings (TBCs) are widely used to protect hot section components of equipment such as aircraft engines, marine propulsion systems, and industrial gas turbines, from the extreme temperatures of the associated gas. Advanced thermal barrier coatings are needed to satisfy more demanding durability requirements, such as those of industrial gas turbines operating at turbine inlet temperatures of 2650° F. (1454° C.) and beyond.

Yttrium aluminum garnet (YAG) has desirable properties for a thermal barrier coating as previously disclosed, for example, in International Publication Number WO 2013/163058, published on Oct. 31, 2013, which also discloses methods of making such coatings. In some embodiments such coatings can be made to have significantly reduced thermal conductivity by doping with other elements.

Disclosed herein are methods of enhancing the durability of ceramic coatings. Embodiments of this invention also include methods of fabricating ceramic coatings. Embodiments of this invention further include equipment that has at least one or more components that may experience temperatures in excess of 700° C. that utilize these improved coatings and/or coatings processed using the methods described herein. Embodiments of this invention further include operation and use of equipment that has at least one or more components that utilize these improved coatings and/or coatings processed using the methods described here.

As used herein, the term "coating" describes a coating that may be used in any of the types of equipment described above. The embodiments describing the methods, use and equipment listed above also include any embodiment of the coating, alone or in combination, included in the rest of this document. A thermal barrier coating may be treated as a type of thermal barrier coating, and where the word "coating" is used in the rest of this document, it can, but does not necessarily, refer to a thermal barrier coating. Further, the word "coating" may refer to a coating produced by any technique, including without limitation, thermal spray (including plasma spray), physical vapor deposition (PVD) including electron beam physical vapor deposition (EB-PVD), chemical vapor deposition (CVD), solution based techniques such as sol-gel techniques, sputtering, any method conventionally referred to as "thin film deposition" and electrochemical deposition techniques. Further the word "coating" may refer to a coating of any thickness, and in particular to a coating of thickness between 1 micrometer and 10 millimeters. The word "coating" anywhere in this document may also refer specifically to a thermal barrier coating.

The word "equipment", unless otherwise explicitly specified, used anywhere in this document may refer to, without limitation, equipment that has at least one or more components that may experience temperatures in excess of 700° C., including gas-fired engines and turbines, coil-fired engines and turbines, biomass-fired engines and turbines, boilers, chemical reactors, hot gas/liquid pipelines, fuel cells (including solid oxide fuel cell and molten carbonate fuel cell systems), and gas production/extraction/purification/concentration systems. Further, the word "equipment" includes any equipment that may at any time during assembly or operation have a function that requires at least one component, which may be a metal component, to experience a temperature less than 25° C. below the temperature of the operating environment, or the temperature that the fluid (gas or liquid) in the operating component of that component may experience at the same time, or a time within a short duration prior (to account for the time taken for heat transfer). Also, the word "equipment" in this document may refer to any equipment that may at any time during assembly or operation be exposed to reactive solid species that is carried by a fluid. This reactive solid species may comprise, without limitation, particles or "ash". The reactive species may comprise, without limitation, particles that are introduced into the fluid from the environment around the equipment (e.g. dust particles in the air), or formed during the operation of the equipment (e.g. fly ash particles formed during combustion of coal, biomass, etc.).

Yttrium aluminum garnet (YAG) has desirable properties for a thermal barrier coating as previously disclosed and the inventors have disclosed methods of making such coatings. (See Maurice Gell et al. METHOD OF FORMING THERMAL BARRIER COATING, THERMAL BARRIER COATING FORMED THEREBY, AND ARTICLE COM- PRISING SAME, International Publication Number WO 2013/163058, published on Oct. 31, 2013. [53 pages], hereinafter "Gell", the contents of which are hereby incorporated by reference herein.) One embodiment of this invention describes a method of enhancing the durability of thermal barrier coatings that may be used in engines, turbines or other equipment that have at least one or more components that may experience temperatures in excess of 700° C. Embodiments of this invention also include methods of fabricating thermal barrier coatings, to be used in engines, turbines or other equipment that have at least one or more components that may experience temperatures in excess of 700° C., that have greater durability and/or reliability compared with today's state of the art thermal barrier coatings. All modern gas turbines have thermal barrier coatings (TBCs). Thermal barrier coatings are typically ceramic coatings that have thermal conductivity. The improvement in firing temperatures these allow along with the durability improvement are so compelling that all modern gas turbines use such coatings.

Other embodiments disclosed herein may include engines, turbines or other equipment that has at least one or more components that may experience temperatures in excess of 700° C. that utilize these improved coatings and/or coatings processed using the methods described herein. Embodiments of this invention further include operation and use of engines, turbines or other equipment that has at least one or more components that may experience temperatures in excess of 700° C. that utilize these improved coatings and/or coatings processed using the methods described here. In the rest of this document, the term "thermal barrier coating" describes a coating that may be used in any of the types of equipment described above. The embodiments describing the methods, use and equipment listed above also include any embodiment of the thermal barrier coating, alone or in combination, included in the rest of this document.

In, some embodiments of this invention, the thermal barrier coating may comprise a doped yttrium aluminum garnet (YAG) based material. In some embodiments of this invention, the thermal barrier coating may comprise a rare earth oxide doped YAG based material. Some embodiments of this invention may possess higher maximum use temperature and/or better erosion resistance. Some embodiments of this invention may include a thermal barrier coating with lower thermal conductivity than one with similar thickness and porosity and manufactured with an undoped YAG or with yttria-stabilized zirconia. Some embodiments of this invention may include a rare earth element doped YAG material, where the dopant may be one or more oxides of one or more of the elements represented by the chemical symbols La, Ce, Pr, Nd. Pm, Sm, Eu, Gd, TB, Dy, Ho, Er. Tm, Yb, Lu, and Y, Sr and Sc. Some embodiments of this invention may include a rare earth element doped YAG material, where the dopant may be one or more oxides of one or more of the elements represented by the chemical family commonly referred to as the Lanthanides. The choice of any particular dopant or combination of dopants in no way limits the scope of this invention.

It should specifically be noted that coatings disclosed herein may or may not contain other materials, including other ceramic or oxide materials in addition to the YAG based materials and the inclusion or non-inclusion of such other materials in no way limits the scope of this invention. These other materials may be added deliberately to change or tailor specific properties of the coating and/or be included, intentionally or unintentionally, as byproducts of the coating process. In particular, the composition of the coating may contain excess Y than specified for the line compound YAG. In particular, such coatings may contain one or both of yttrium aluminum monoclinic (YAM) or yttrium aluminum pervoskite (YAP).

A continuing problem in the field of operation of equipment at higher temperatures, especially under combustion conditions, is the degradation of the performance of a thermal barrier coating due to the reaction with or degradation caused by reactive species. For example, this reactive species may be components of the "fly ash" —particles in the combustion gas environment—that are deposited on the surface of the coating during operation. One component in the fly ash that may also arise from any number of sources which is particularly problematic is calcium magnesium alumino-silicate (CMAS). CMAS and similar deposits may arise from many sources including volcanic ash, windblown sand or dust, particles from industrial activities such a mining and manufacturing. Embodiments of the invention apply to the mitigation of this mineral or oxide deposition problem regardless of the origin. YAG itself may be a good choice as a CMAS resistant coating. An important feature of YAG that has been demonstrated by the contributors to this disclosure and which is consistent with optical basicity theory [A. Krause, B. Senturk, H. Garces, G. Dwivendi, A. Ortiz, S. Sampath and N. Padture, "2ZrO2. Y2O3 Thermal Barrier Coatings Resistant to Degradation by Molten CMAS: Part I, Optical Basicity Considerations and Processing," J. Am Ceram. Soc , 97 {12} 3943-3949 (2014), and A. Krause et al. "2Zr)2.Y2O3 Thermal Barrier Coatings Resistant to Degradation by Molten CMAS: Part II, Interactions with Sand and Fly Ash," J. Am Ceram. Soc, 97 {12} 3950-3957 (2014), hereinafter "Krause", the contents of which are hereby incorporated by reference herein] is that YAG is nearly inert in the presence of CMAS (FIG. 1). The primary vulnerability to CMAS for a YAG based coating is infiltration via cracks and pores.

The current standard method of coping with CMAS for other types of coatings is to have materials that react with CMAS creating new phases in the CMAS or other similar contaminants that cause it to solidify into this new phase that arrests the flow and attack of the contaminants including CMAS. In so reacting, the coating will be eventually depleted of reacting elements and will ultimately fail. This reaction is across a broad front at all locations. Because of materials transport, the reactive element will be eventually depleted by this reaction occurring on a large surface area. The most widely studied and commercially implemented version of this approach is based on gadolinium zirconate coatings [C G Levi, J. Hutchinson, M H Vidal-Setif and C A Johnson, Environmental degradation of thermal-barrier Coatings by molten deposits, "MRS Bulletin, Vol. 37, pp. 932-941, (2013), hereinafter "Levi", the contents of which are hereby incorporated by reference herein]. For all such coatings there is full planar surface reaction with the CMAS consuming some of the underlying coating to arrest the CMAS infiltration.

Embodiments of this invention describe a fundamentally different approach to prevention of degradation of the coating and/or the metal components that the coating is designed to protect. In some embodiments of this invention, reactive species blocking reactions are promoted at least in part in cracks and/or pores in the coating. In some embodiments of this invention, a majority, most or all of the reactive blocking is locally in cracks, pores and/or pore channels. The term "pore channel" in this disclosure may refer to, without limitation, any space between at least two parts of the coating that may be introduced during processing or operation, without limitation on the processing technique. For instance, a "pore" may refer to a space between at least two columns in a coating fabricated by an electron beam physical vapor (EBPVD) deposition technique. Also, for instance, a "pore" may refer to a crack or microcrack in a coating fabricated by a plasma spray technique method, including, without limitation, air plasma spray (APS), solution precursor plasma spray (SPPS) and/or suspension plasma spray (SPS). Also, for instance, a "pore" may refer to a crack in a coating fabricated by a thermal spray method, where the coating has a nominally high density between at least two of these cracks. Also, for instance, a "pore" may refer to a crack in a coating that may be referred to by those familiar to the art as a "dense vertically cracked" coating.

In some embodiments of the coating, the inert properties of the YAG are relied upon to provide some, most or all of the CMAS blocking. In some embodiments of this invention, at least one pore, pore channel, crack, microcrack will contain at least one reactive material to arrest the infiltration in that pore, pore channel, crack, microcrack.

In some embodiments of this invention, the coating will contain at least some yttrium oxide added to the YAG. In some embodiments, the coating may contain yttrium-rich regions. In some embodiments, the coating may contain yttrium-rich regions, which when encountered by a reactive species (including CMAS) will be significantly reactive to the reactive species and arrest infiltration of the reactive species.

In some embodiments of this invention, the coating may comprise a non-stoichiometric YAG composition. In some embodiments of this invention, the coating may comprise a non-stoichiometric YAG composition represented by a composition on the yttria-alumina phase diagram with a yttria/alumina composition near, but not exactly the same as that of stoichiometric YAG. Some embodiments of the invention may contain yttrium aluminum monoclinic (YAM) or Yttrium aluminum perovskite (YAP), also known under the name of yttrium orthoaluminate. In some embodiments of the invention, YAP or YAM may react more strongly with a reactive species (including CMAS) than YAG. In some embodiments of this invention, the coating may primarily comprise of YAG and YAM.

Embodiments of coatings disclosed herein may be fabricated by one of the methods described herein.

In one method, cracks are infiltrated with reactive CMAS blocking materials.

In one step, choose a highly reactive ceramic, hereafter referred to as "HRC", to be selectively deposited into the cracks, porous locations and near surface locations of YAG. The reactive ceramics are to specifically include yttria, and all oxides of the lanthanides (La, Ce, Pr, Nd, Pm, SM, Eu, Gd, Tb, Dy, Ho, Er, Tm, Yb, Lu).

In another step, infiltrate the pores and cracks with these materials by, without limitation, at least one of the following several methods listed as a, b, or c below.

a. Slurry/Suspension Method: Mix the oxide in very fine particle form with a liquid carrier to form a slurry or suspension, such that the particles can easily fit into the cracks, microcracks, pores or pore channels. The sizes of particles used in this method may range, without limitation, from nanometers to multiple micron sizes. Liquids carriers that may be used in this method may comprise, without limitation, water and/or any organic liquid. Specifically, the organic liquids in this method may include, without limitation thermo set plastics. Embodiments utilizing this method have been successfully reduced to practice as illustrated in FIG. 2 and FIG. 3.

b. Chemical Precursor Method: Use at least one chemical precursor that upon exposure to a temperature, at least in excess of 50° C., will produce at least some of at least one highly reactive ceramic (HRC). The chemical precursor may include, without limitation, at least one nitrate, chloride, fluoride, acetate, propionate, isopropoxide, and/or citrate and any carboxylate. The precursor may be a liquid. This liquid may include, but not be limited to, aqueous and non-aqueous solutions of the candidate elements of at least one lanthanide (La, Ce, Pr, Nd, Pm, SM, Eu, Gd, Tb, Dy, Ho, Er, Tm, Yb, Lu). In some embodiments, the liquid may include compositions, which after thermal exposure may produce at least some YAM or YAP. Embodiments disclosed herein include coatings, use of coatings and methods of fabrication of coatings where the infiltration could be done with gas or vapor phase infiltration.

c. Methods to infiltrate Precursors The Slurry/Suspensions and Chemical Precursors listed above are collectively referred to as "precursors". Methods to infiltrate the precursors into the cracks, microcracks, pores or pore channels may include, without limitation, at least one of: (1) direct infiltration by immersion or spraying, or (2) vacuum assisted infiltration in which the sample is put under a vacuum and the precursor is spread or poured on the surface followed by breaking the vacuum to force the precursor into the cracks, microcracks, pores and/or pore channels; vacuum may be repeatedly applied and broken. Some embodiments may include single or multiple infiltrations. In some embodiments that may include multiple infiltrations, heat treatment between one or more infiltrations may be included. Heat treatment may be used to remove suspending agents and/or to pyrolyze the precursors to make additional infiltration easier.

The above methods can be used in any combination and repeated as needed to achieve the degree of infiltration desired.

In another method, the Y content of YAG is increased to produce more reactive coating.

The reaction behavior of CMAS with ceramics can be roughly predicted by optical basicity OB theory [Krause]. This theory correctly predicts the low reactivity of YAG and high reactivity with CMAS of Y and Gd. In addition, it predicts increasing reactivity as the Y content of YAG is increased in the limit to produce YAM.

Experimental results disclosed herein (FIG. 4) show the solution sprayed YAG can contain YAM as a second phase. The OB theory [Krause] suggests that this phase will be very reactive and will stop CMAS infiltration.

It is demonstrated herein that with small excesses of yttrium the primary phases formed are YAG and primarily YAM (FIG. 3). YAM is not the phase predicted by the equilibrium phase diagram for this low level of excess yttrium, rather YAP is the predicted phase. Disclosed herein is the surprising finding in thermal spray processing, that YAM is formed more than YAP. This unexpected and non-obvious result is favorable in that YAM is expected based on general understandings in the field [For example, Krause] to be more reactive to a reactive species such as CMAS.

Some embodiments of this invention include coatings with YAG based compositions wherein the amount of Y relative to Al in YAG is increased to increase the amount of YAM and/or also increase the amount of YAP in the coating.

In some embodiments, the coating may comprise a multiphase coating that may contain more than one of YAG, YAM and YAP.

In some embodiments, such as coatings used in equipment, a reactive species including CMAS, while infiltrating cracks, microcracks, pores and/or pore channels will contact YAM and/or YAP and react and be substantially blocked from further infiltration.

Some embodiments of this invention include coatings with compositions that are on the $Y_2O_3$ rich side of the $Y_2O_3$—$Al_2O_3$ phase diagram relative to stoichiometric YAG. Further embodiments of this invention include use or operation of equipment that include such $Y_2O_3$-rich YAG-based coatings. Some embodiments of this invention include methods of manufacturing or making coatings, including thermal barrier coatings, that have a $Y_2O_3$-rich YAG-based composition by a process that, without limitation, may include a thermal spray (including plasma spray) process, a PVD (including EBPVD) process, a CVD process, a sputtering process or a solution based process.

In another method, a stratified microstructure is created with inert and reactive layers.

Disclosed herein is a microstructure that allows arrest of contaminant infiltration, by way of example, a microstructure wherein there is at least one (and potentially more) "inert layer" or "inter layers" (i.e. layers that are not very reactive to an infiltrating reactive species) and at least one "highly reactive ceramic" layer (HRC layer) or "reactive layer" (i.e., a layer comprised of materials that react with a reactive contaminant species to potentially slow or arrest their infiltration). Such coatings are referred to as "stratified coatings". The inert layers may comprise materials not limited to, YAG-based materials. Reactive layers can include, but are not limited to one or more oxides of Y and/or any lanthanide (La, Ce, Pr, Nd, Pm, SM, Eu, Gd, Tb, Dy, Ho, Er, Tm, Yb, Lu). In such a microstructure, an infiltrating reactive species will encounter reactive layers that can arrest infiltration in cracks and pores, one or more times.

An embodiment of a microstructure disclosed herein comprises a YAG-based material as an inert layer and a material containing yttrium oxide as a reactive phase. In another embodiment, the YAG may be used as the inert phase and the reactive phase may contain or comprise YAP (which is in equilibrium phase stable with YAG according to the equilibrium phase diagram). In another embodiment, YAG may be used as the inert phase and the reactive phase may contain or comprise YAM.

Disclosed herein are coatings/microstructures where more than one inert phase is used or more than one reactive phase is used or both multiple inert and multiple reactive phases are used. Because of the broad range of possible reactive species, the use of multiple inert and reactive materials can provide protection from a wide range of reactive species. No one material is inert or (HRC) reactive to all possible contaminants or reactive species such as CMAS.

An embodiment of multiple material layers is that different layer pairs would be deposited one pair at a time. For example, one might have a relatively thin layer of YAG, $Y_2O_3$ alternating with layers of YAG and gadolium zirconate (FIG. 5A). In some embodiments, the coating may have many other arrangements where in the inert layer's composition is changed or where both layers are changed. The purpose of such an arrangement would be to achieve a higher concentration of the desired reactive or inert materials than could be achieved if, for example, two reactive elements were used during the same spray application.

In additional embodiments disclosed herein, embodiments also include layers that may include or comprise mixed phases such as in FIG. 5B. Many variations in addition to those of FIG. 5 are possible, as FIG. 5 is only meant to illustrate the concept. Not represented, but also included in the disclosure herein, are embodiments where there is alternation of the inert phase with for example YAG as one inert phase and some other composition as another inert phase. Some embodiments specifically include thermal spray processes and coatings thereby fabricated where more than two powder types are used in one spray pass. In some embodiments, the coatings may comprise three materials phases or mixed phase layers or combinations thereof, are produced.

Some embodiments of this invention include use or operation of equipment that include such stratified coatings. Some embodiments of this invention include manufacturing or making stratified coatings, including thermal barrier coatings, that have a $Y_2O_3$-rich YAG-based composition by a process that, without limitation, may include a thermal spray (including plasma spray) process, a PVD (including EBPVD) process, a CVD process, a sputtering process or a solution based process.

A microstructure of this general type having inert and reactive layers is shown in FIG. 6. We note that FIG. 5 is not an inert with a reactive phase material but instead illustrates that layered phase structure may be obtained by spraying mixed powders. Such structures may be made as follows. Specifically, if mixed powders are sprayed either as dry powders or in suspensions with one or more types of powder materials, separation of the phase in the deposits is generally observed which upon deposition by thermal spray (plasma spray or combustion torch spray) leads to layering as the arriving material flattens on impact. This is especially prominent when suspending two powders in a suspending liquid to produce a coating using mixed powders in the process commonly known in the field as suspension plasma spray. This structure can also be produced spraying mixed dried powders. The methods for producing desired microstructures comprises thermal spray of mixed powders of inert and reactive materials either by mixed dry powders or suspension spray or by hybrid spray in which one material is suspended and the other is delivered as a solution.

FIG. 2 depicts infiltration of YSZ with yttria materials via suspended powders. FIG. 2 further depicts materials stacked on top of the coating forming a dense layer as shown by the arrows.

All documents cited herein and the following listed documents that are attached hereto for submission, all referenced publications cited therein, and the descriptions and information contained in these documents are expressly incorporated herein in their entirety to the same extent as if each document or cited publication was individually and expressly incorporated herein:

Maurice Gell et al. METHOD OF FORMING THERMAL BARRIER COATING, THERMAL BARRIER COATING FORMED THEREBY, AND ARTICLE COMPRISING SAME, International Publication Number WO 2013/163058, published on Oct. 31, 2013. [53 pages].

While the invention has been described with reference to embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. Further, it should further be noted that the terms "first," "second," and the like herein do not denote any order, quantity, or relative importance, but rather are used to distinguish one element from another. The modifier "about" used in connection with a quantity is inclusive of the stated value and has the meaning dictated by the context (e.g., it includes, at a minimum the degree of error associated with measurement of the particular quantity).

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

Chemical compounds are described using standard nomenclature. Unless defined otherwise, all technical and scientific terms used herein have the same meaning as is commonly understood by one of skill in the art to which this invention belongs.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A microstructure to arrest contaminant infiltration comprising:
    at least one inter layer, wherein the inter layer is not reactive to an infiltrating contaminant species, wherein the inter layer comprises at least two layers of YAG; and
    a highly reactive ceramic layer (HRC layer), wherein the HRC layer comprises materials that react with the infiltrating contaminant species to slow or arrest infiltration of the infiltrating contaminant species, wherein the HRC layer comprises:
        a layer comprising $Y_2O_3$ between the at least two layers of YAG; and
        a layer comprising $Gd_2Zr_2O_7$ between the at least two layers of YAG; and
    another layer of YAG between the at least two layers of YAG and also between the layers comprising $Y_2O_3$ and $Gd_2Zr_2O_7$.

2. The microstructure of claim 1, further comprising at least one additional inert layer or at least one additional HRC layer.

3. A microstructure to arrest contaminant infiltration comprising:
    at least one inter layer, wherein the inter layer is not reactive to an infiltrating contaminant species, wherein the inter layer comprises layers of YAG; and
    a highly reactive ceramic layer (HRC layer), wherein the HRC layer comprises materials that react with the infiltrating contaminant species to slow or arrest infiltration of the infiltrating contaminant species, wherein the HRC layer comprises a first layer of $Y_2O_3$+$Gd_2Zr_2O_7$ between layers of YAG and a second layer of $Y_2O_3$+$Gd_2Zr_2O_7$ between the layers of YAG.

4. The microstructure of claim 3, further comprising at least one additional inert layer or at least one additional HRC layer.

5. A microstructure to arrest contaminant infiltration, the microstructure comprising:
    a plurality of layers of YAG;
    a layer comprising $Y_2O_3$ between two of the plurality of YAG; and
    a layer comprising $Gd_2Zr_2O_7$ between two of the layers of YAG.

6. The microstructure of claim 5, further comprising an additional layer of YAG between the layers comprising $Y_2O_3$ and $Gd_2Zr_2O_7$.

7. The microstructure of claim 5, wherein the layer comprising $Y_2O_3$ is separate from the layer comprising $Gd_2Zr_2O_7$.

8. The microstructure of claim 5, wherein:
    the layer comprising $Y_2O_3$ further comprises $Gd_2Zr_2O_7$; and
    the layer comprising $Gd_2Zr_2O_7$ further comprises $Y_2O_3$.

9. The microstructure of claim 5, wherein the layers comprising $Y_2O_3$ and $Gd_2Zr_2O_7$ comprise a plurality of layers of $Y_2O_3$+$Gd_2Zr_2O_7$ between the plurality of layers of YAG.

* * * * *